J. THOMPSON.
BRAKE ROD JAW.
APPLICATION FILED JAN. 22, 1915.
1,200,543.
Patented Oct. 10, 1916.
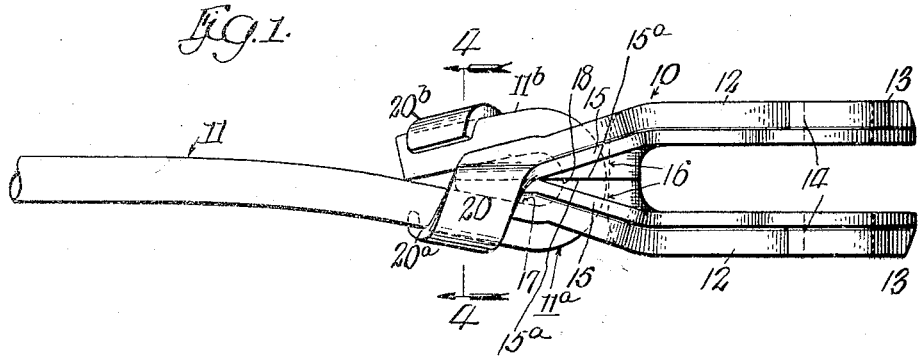
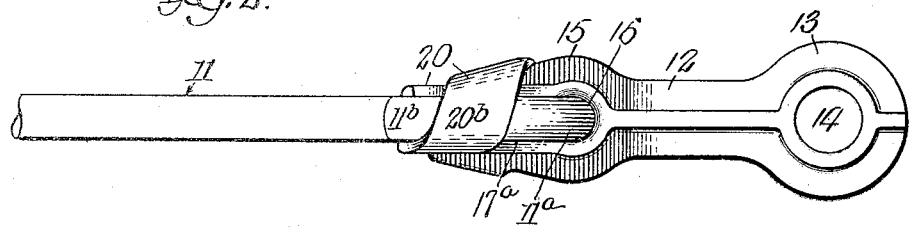
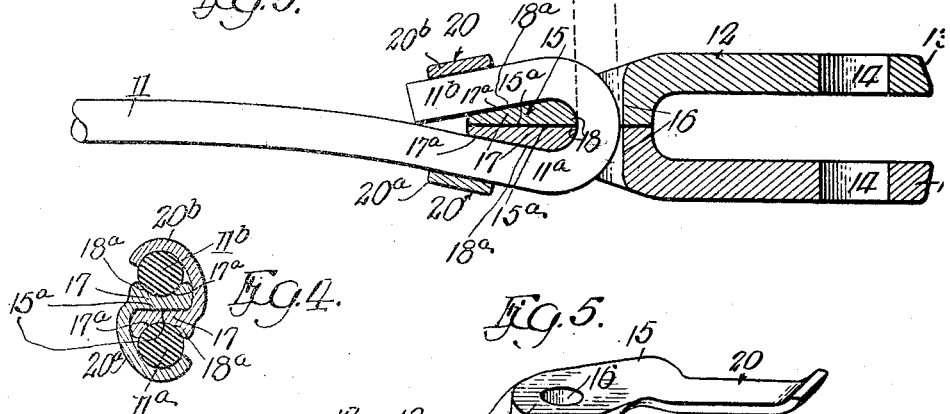
Witnesses:
Inventor
Joseph Thompson

UNITED STATES PATENT OFFICE.

JOSEPH THOMPSON, OF HAMMOND, INDIANA.

BRAKE-ROD JAW.

1,200,543.  Specification of Letters Patent.  Patented Oct. 10, 1916.

Application filed January 22, 1915. Serial No. 3,694.

*To all whom it may concern:*

Be it known that I, JOSEPH THOMPSON, a citizen of the United States, and a resident of Hammond, in the county of Lake and State of Indiana, have invented certain new and useful Improvements in Brake-Rod Jaws; and I do hereby declare that the following is a full, clear, and exact description thereof, reference being had to the accompanying drawings, and to the letters of reference marked thereon, which form a part of this specification.

This invention relates to improvements in brake rod jaws and consists of the matters hereinafter described and more particularly pointed out in the appended claims.

A brake rod jaw is a device interposed between the brake lever and brake rod of a railway car to operatively connect them. As the brake rod jaws are subjected at times to excessive strains, they must be of great strength to resist such strains. At the same time they should be cheap to manufacture and easy to attach to the brake rod. Brake rod jaws that can be attached to the rod without welding as now made are usually of cast metal and breakage frequently occurs, thus allowing the brake rod to drop with resulting damage. A brake rod jaw made by the drop forging process has long been sought after by the railroads, on account of the great strength of such a jaw.

The object of this invention is to provide a practical brake rod jaw of a form permitting it to be economically made by the drop forging process so as to compete in price with cast metal jaws and which may be quickly and easily attached to the brake rod without welding and without the use of rivets or bolts.

The various advantages will appear as I proceed with my specification.

In the drawings: Figure 1 illustrates a view in side elevation of a brake rod jaw made in accordance with my invention as it appears when attached to the loop or eye of a brake rod. Fig. 2 illustrates a top plan view thereof. Fig. 3 illustrates a longitudinal central sectional view through my improved brake rod jaw, the associated brake rod to which it is attached, being shown in side elevation. Fig. 4 illustrates a detail transverse sectional view, the plane of the section being indicated by the line 4—4 of Fig. 1. Fig. 5 illustrates a perspective view of one of the members forming the jaw as a whole, as it appears before applied with a like member, to the end of the brake rod.

Referring now to that embodiment of my invention illustrated in the accompanying drawings, 10 indicates as a whole my improved brake-rod-jaw and 11 indicates the brake-rod to which it is attached. The jaw 10 comprises two parts 12—12. Each part 12 has a head 13 in which is provided the usual transverse aperture 14 for the coupling pin. (As illustrated herein, the jaw is provided with but one pair of apertures for the coupling pin but manifestly it may be provided with more than one pair just as in the case of jaws heretofore made.) The heads 13—13 are spaced apart to form a fork for embracing the brake lever (not shown).

The two jaw parts 12—12 have tail pieces 15—15, which are arranged at an angle to their respective heads and which have flat contact surfaces 15$^a$—15$^a$ extending in planes parallel to and spaced from the heads of said jaws and are adapted for engagement, the one with the other, when the two jaws are in assembled relation and properly connected together and with the brake rod as hereinafter described. The two tail pieces thus provide the crotch of the fork of which the head pieces form the tines. The tail pieces are provided adjacent the crotch with alined transverse passages 16—16 which are parallel to the common axis of the coupling pin apertures 14 of the jaw. The outer faces of the tail pieces 15—15 are provided with longitudinally extending grooves 17$^a$—17$^a$ which blend into and are connected with the transverse passages 16—16, the said grooves and passages together forming in the jaw, when assembled, a web 17, having a rounded forward edge 18 and converging, inclined sides 18$^a$—18$^a$, which web is adapted to be embraced in a familiar manner by the eye 11$^a$ of the brake rod 11. Each tail piece is provided with a strap extension 20 which when the jaw part is drop forged forms a flat extension of the tail piece inclined away from the longitudinal axis of the jaw part.

Said strip extension is adapted to be bent about the parts of the brake rod forming the eye in such manner as to rigidly bind the parts of said eye together, and to lock said jaw members in proper spaced relation. The strap extension of one jaw part for example is bent about and forms an abutment 20ª for engagement with one side of the brake rod part forming the eye of the brake rod and the strap extension of the tail piece of the opposite jaw is bent about and forms an abutment for the bent over end 11ᵇ of the brake rod forming an abutment 20ᵇ for the other side of said eye of the brake rod.

The manner of assembling the parts of the improved brake rod and brake rod jaw will be apparent to those familiar with the art from the foregoing description. The jaw parts are brought together with their contact faces 15ª—15ª in engagement in such manner as to provide the crotch of the jaw; and the brake rod with its end bent at an angle as illustrated in dotted lines in Fig. 3 is threaded through the transverse apertures 16—16 in the tail pieces of said jaw parts. The end 11ᵇ of the brake rod is then bent down to form the eye in such manner that the parts of the rod forming the eye will properly engage within the grooves 17ª—17ª and embrace the web 17. The strap extensions are then bent about the parts of the rod forming the eye so as to provide the abutments for retaining said rod rigidly in the bent form. By reason of the arrangement of the strap extensions which form the abutments in the manner described, so that the abutment for one side of the eye is connected to the jaw part on the other side of the eye, it will be manifest that any tendency of the eye to open up will act to more rigidly bind together the tail pieces of the jaw parts at the crotch, which is likely to be the weakest part of a brake rod jaw.

Manifestly, each of the jaws 12 is of such form that it may be made by drop forging from a steel or iron bar. It may be made so that the fiber of the metal extends parallel to its length and in line with the general direction of the line of strain. Thus the brake rod jaw may be so constructed as to resist the maximum strain in all cases.

While in describing the invention herein I have referred to it more particularly as a brake rod jaw for which purpose it is primarily intended, it will be manifest that it may be used with similar advantage in numerous other connections, as for example, in bridge work, for the connection of tie rods or other tension members. Those familiar with the art will also realize its practicability to other uses. It is therefore to be understood that although the invention is entitled as a brake rod jaw it is not in any sense to be limited to its use in that connection.

Whereas, in describing my invention, I have referred to certain details of construction and arrangement, it is to be understood that the invention is in no way limited thereto except as may be pointed out in the appended claims.

I claim as my invention:

1. A rod-eye and jaw construction comprising a jaw made in two parts, each part consisting of an apertured head and of a tail piece arranged at an angle to said head piece and having a contact surface adapted for engagement with the like contact surface of the associated jaw part, the two tail pieces thus providing the crotch of the fork of which said two head parts form the tines, the two tail pieces being provided with similarly placed apertures adapted to be alined in the assembled jaw and with longitudinally extending grooves on their outer faces inclined toward the plane of their contact faces to define a web member in the assembled jaw having inclined sides and each tail piece being provided with a strap extension adapted to be bent about the parts of the rod forming the eye to form abutments to prevent the opening of said eye.

2. A rod-eye and jaw construction comprising a jaw made in two parts, each part consisting of an apertured head and of a tail piece arranged at an angle to said head, each tail piece having a contact surface adapted for engagement with the like contact surface of the tail piece of the other jaw part, so that the two tail pieces provide the crotch of the fork of which the two heads form the tines, the two tail pieces being provided with similarly placed apertures adapted to be alined in the assembled jaw and being provided with longitudinally extending grooves on their outer faces inclined toward the plane of their contact faces, said apertures and grooves defining a web member in the assembled jaw adapted to be embraced by the eye of the rod, and each tail piece being provided with a strap extension adapted to be bent about the parts of the rod forming the eye of the rod to provide abutments to prevent the opening of said eye, the strap extension of one jaw providing the abutment for the part of the rod that is in substantially the plane of the other jaw.

3. A rod-eye and jaw construction comprising a jaw made in two parts, each part consisting of an apertured head and of a tail piece having a contact surface adapted for engagement with the like contact surface of the associated jaw part, the two tail pieces thus providing the crotch of the fork of which said two head parts form the tines, the two tail pieces being provided with similarly placed apertures adapted to be alined in the assembled jaw and with longitudinally extending grooves on their outer faces to define a web member in the assembled jaw and each tail piece being provided with a strap extension adapted to be bent about the parts of the rod forming the eye to form abutments.

In testimony, that I claim the foregoing as my invention I affix my signature in the presence of two witnesses, this 20th day of January, A. D. 1915.

JOSEPH THOMPSON.

Witnesses:
T. H. ALFREDS,
KARL W. DALL.

Copies of this patent may be obtained for five cents each, by addressing the "Commissioner of Patents, Washington, D. C."